Dec. 9, 1952     W. L. HOWLAND     2,621,276
ELECTRICAL STRAIN GAUGE AND METHOD OF MAKING SAME
Filed Dec. 9, 1949     2 SHEETS—SHEET 1
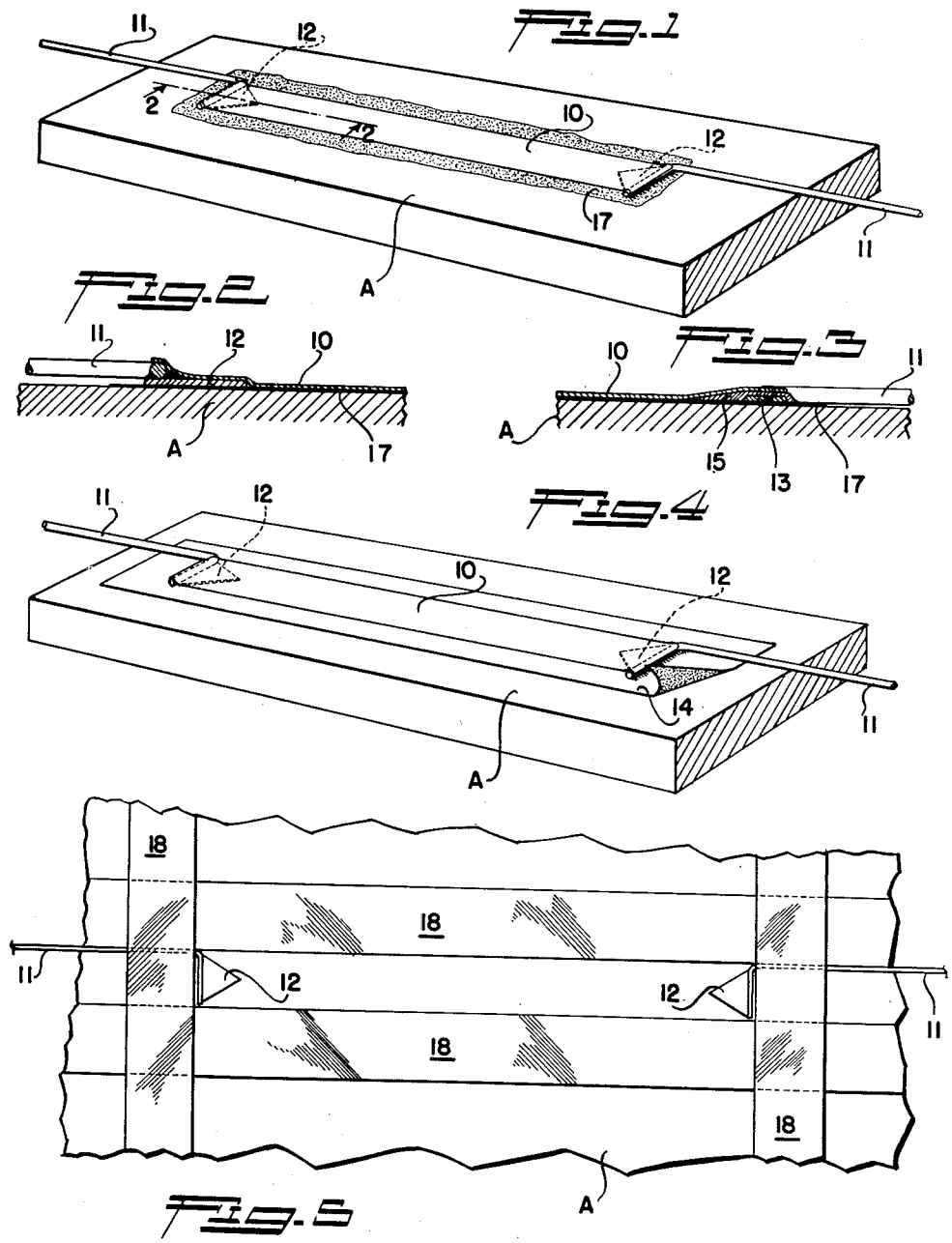
INVENTOR.
WALTER L. HOWLAND
BY George A. Sullivan
Agent

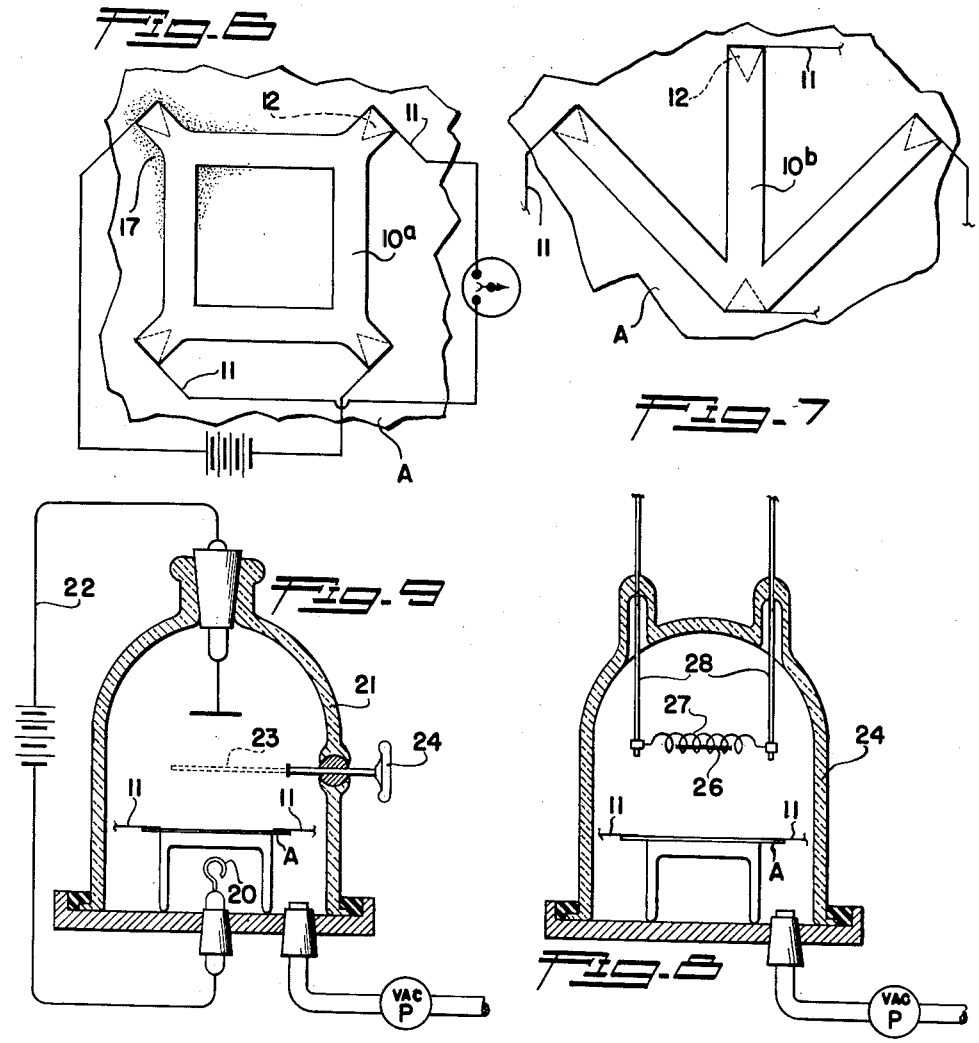
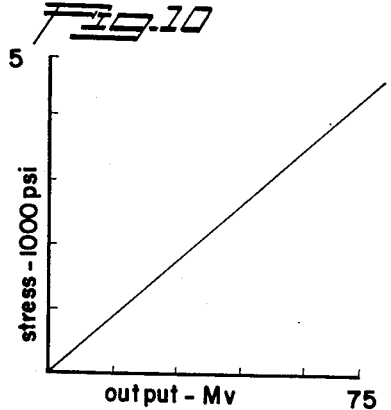

Patented Dec. 9, 1952

2,621,276

UNITED STATES PATENT OFFICE 2,621,276

ELECTRICAL STRAIN GAUGE AND METHOD OF MAKING SAME

Walter L. Howland, Glendale, Calif., assignor to Lockheed Aircraft Corporation, Burbank, Calif.

Application December 9, 1949, Serial No. 132,117

4 Claims. (Cl. 201—63)

This invention relates to novel forms of, and improved methods for making electrical strain gauges used for measuring stresses and strains in articles to which such gauges are applied.

Since the electrical circuits used in connection with measuring and/or recording the strains to which the gauges are subjected are already well known in the art, this application will not elaborate thereon but will be confined to new and improved strain gauges per se, and new and novel methods of making the same.

Electrical strain gauges of the filament type have gone into general use during the past several years, especially in static and dynamic tests of complete articles and the components thereof; such tests facilitating the computation of stresses in complicated structures such as an airplane wing or landing gear under actual or simulated loading conditions, including flight testing of the various parts or elements incorporated in a complete airplane.

Such gauges, as heretofore used, have usually been constructed of a length of fine wire wound back and forth in spaced parallel lines to multiply the sensitivity of the complete gauge while reducing the size thereof. The several parallel wires are bonded throughout their lengths to an insulating base by a suitable cement, and when the gauge is to be used it is in turn cemented to the article to be tested, sometimes as an arm of a bridge circuit wherein other arms of the bridge are, in effect, dummy gauges.

In the use of these prior gauges it has been found that the greatest difficulty with such wire wound strain gauges lies in the delicacy and difficulty or manufacture thereof. The handling of the fine wire is difficult, and the wire itself lacks flexibility of electrical properties. That is to say, it is fairly inflexible as to strain sensitivity and temperature compensation; also it is impractical to make gauges of high resistance; i. e. greater than 5000 ohms. The gauge is also limited seriously by the characteristics of the bonding cement, as the gauge is based on the principle of a metallic wire being cemented down throughout its entire length, since temperature effects on the cement limit the operating temperature, and the long time stability of the cement is questionable. When the article under test is strained the gauge wire also changes dimensions and thus its resistance, part of the resistance change being due to a change in resistivity of the wire material itself.

A further very serious defect of these prior wire type gauges lies in the temperature limitations on the use thereof. It will be evident that ideally the gauge should match the temperature characteristics of the material of the article on which the gauge is to be mounted. It will be evident from the widely different temperature characteristics of steel and dural or aluminum alloys that a gauge suitable for the former would produce false strain indications when used on the latter when the article to be tested is subject to uncontrolled temperature fluctuations. Wire type gauges that can be adjusted to the temperature characteristics of dural have been unobtainable because no suitable material or alloy having the required temperature characteristics was known that could be produced in the form of a wire of the required fineness.

It is accordingly among the important objects of this invention to provide novel improvements in electrical strain gauges per se; and novel methods of making the same whereby greatly improved strain sensitivity, wide variations in resistance and temperature characteristics, and the ability to utilize strain sensitive materials that cannot be produced in the form of fine wires and therefor have heretofore been unavailable for use in producing electrical strain gauges of the type presently used. Certain of the novel methods of making electrical strain gauges disclosed herein also permit forming the gauge in situ on an article to be tested.

By means of my improved and novel methods of manufacturing strain gauges I am enabled to produce film-like layers of pure metals, metal alloys, metallic salts, mixtures of plastics and pure metals and/or plastics and various metal alloys, and/or metallic salts, and/or conductive organic and inorganic salts having unique resistances, strain sensitivity and temperature characteristics. Present fine wire type electrical strain gauges can not be produced with resistances of the order of 5000 ohms or more; have a maximum strain sensitivity factor of two or less, defined as the ratio of change of resistance to original resistance divided by the ratio of change of length to the original length; and the temperature characteristics cannot be even approximately adjusted to various materials to be tested, as for example aluminum alloys such as dural or magnesium alloys. Electrical strain gauges have been produced by the methods of my invention having resistances as high as 50,000 ohms, sensitivity factors of from 2½ to 15, and temperature characteristics widely variable at will to match materials having high thermal expansion characteristics.

Other objects and features of the invention will be readily understood from the following detailed description of typical preferred forms of the invention wherein reference will be made to the accompanying drawings in which:

Figure 1 is a perspective view of an electrical strain gauge embodying the features of this invention as applied to a non-conductive surface;

Figure 2 is an enlarged detail section taken on line 2—2 of Figure 1 showing one of lead-in wire connection;

Figure 3 discloses an alternative form of lead-in wire connection;

Figure 4 shows a gauge of the type of Figure 1 assembled on an insulating base adapted for mounting on conductive surfaces;

Figure 5 shows a preliminary step in the construction of the gauges of Figures 1 and 4 wherein lead-in wires are first secured to a permanent or temporary base, and the balance of the base is masked off to define the desired area on which the strain sensitive material is to be deposited to form the gauge;

Figure 6 is illustrative of a bridge type of multiple gauges formed as a unit, together with a rudimentary electrical circuit to measure the bridge output;

Figure 7 shows a gauge formed as a rosette;

Figure 8 is a schematic showing of apparatus for depositing gauge material by an evaporative process;

Figure 9 represents a sputtering process for depositing gauge material; and

Figure 10 is a chart illustrating the high capacities obtainable from gauges constructed in accordance with this invention.

As shown on the drawings the several forms of electrical strain gauges may be made from various materials of selected electrical resistance values, strain sensitivity and temperature characteristics as will hereinafter be described in detail; the gauges being formed or deposited from the fluid, powder, or vapor state by various methods later to be described in detail. Disregarding the base and mounting arrangements for the moment, the gauge of this invention comprises a strip 10 of thin film-like material of relatively substantial width and length, the dimensions of which can be varied over wide ranges, for example a quarter of an inch wide and one to two inches long. The thickness of this strip will vary from barely miscroscopic to several thousandths of an inch, according to the material used and the desired final resistance value; a material having high resistance characteristics being built up to a greater relative thickness than a highly conductive material to produce the desired resistance in the final strip. This film is built up from material either evaporated, vaporized, atomized, powdered, or suspended or dissolved in a fluid vehicle, and in its finished form is a homeogeneous film resembling a fine foil or mirror coating when using metallic materials. The films formed using initially fluid vehicles may resemble plastic resins, rubber or ink coatings. As shown in Figures 6 and 7, the film can be deposited as multiple legs of a bridge 10a or rosette 10b in which the legs may join at common terminals or lead-in wires 11, thus eliminating wiring and junction troubles.

The lead-in wires 11 must make stable electrically conductive contact with the ends of the film, so that I prefer to solder the ends of the wire to a small piece of thin conductive foil 12 such as silver, gold, or the like, having a tapered or serrated edge to facilitate electrical bonding to the film material, as shown in Figure 2. Alternatively, the end of the wire may be flattened as at 13 in Figure 3.

The wire and foil of Figure 2 is preferably bonded to an insulating base 14 and the film 10 deposited thereover in the process of forming the same. This insulating base 14 may in turn be cemented to an article A, the strains of which are to be measured. The flattened wire end 13 of Figure 3 may be cemented to, or self-bonded to such a base 14 as by depositing a suitable metal 15 by the sputtering process to be later described, after which the film 10 is deposited thereover. Either type of terminal or lead-in may be used with the several physical forms of gauge disclosed.

The material to be used in producing the film 10 may be selected from a wide range of metals, alloys, metallic salts, conductive plastics, and other known electrically conductive materials having suitable strain sensitivity and temperature characteristics selected to accord with the characteristics of the article to be tested. It is convenient to refer to matching the temperature characteristics of the gauge material per se to that of the material on which the gauge is to be used, but this is an oversimplification of the problem. The result desired is that the gauge, when in position on the material to be tested, will have a constant resistance when the temperature is changed. This requires that the resistance change of the gauge due to expansion or contraction of its base plus the resistance change in the gauge material due to the strain and resistance change of the gauge material with temperature, and the effect of the cement, if any, on these qualities must balance out and result in zero resistance change in the absence of a change in load on the material under test.

As illustrative of suitable alloys, an alloy of approximately 55% copper and 45% nickel is commercially available under the trade name Copel and has heretofore been used in fine wire wound type electrical strain gauges. This alloy has a generally falling temperature characteristic on dural and hence is unsuitable for use thereon. Another similar alloy of 50% copper and 45% nickel known by the trade name Advance has a generally rising temperature characteristic on dural, but which approximates that of x4130 grade steel and is hence suitable for use in testing articles made of such material. No alloy now available in the form of a fine wire is commercially known which, when cemented down on dural will result in zero resistance changes with temperature, but by simultaneously or successively depositing approximately equal parts of Copel and Advance alloys to form the film 10 the resulting gauge will have a substantially flat temperature characteristic relative to dural. Another well known alloy known as Nichrome has a much steeper rising temperature characteristic so that a combination of approximately 13% thereof with 87% Copel will approximately match dural. Sulphides of the heavy metals have also been demonstrated to be electrically conductive. (See circular of the Bureau of Standards No. 389 entitled "The Making of Mirrors by the Deposition of Metal on Glass"); and homogeneous coatings of fluorides have been deposited on camera lenses by the evaporative method, to be described hereinafter.

Conductive coatings other than metals and their alloys and compounds can be formed as suspensions or solutions of carbon black or graphite, colloidal silver and the like in suitable vehicles such as varnishes, lacquers and rubber or rubber-like synthetic plastics which may be coated in the liquid form and dried or polymerized to form the final conductive film. Examples of commercially available materials of this character are conductive rubber as compounded by the Goodrich Rubber Company and conductive plastic films produced by the E. R. Hall Company. I have constructed gauges of the type disclosed herein using the Hall materials wherein a conductive plastic film coating impregnated with silver provided a resistance of approximately 1.0 ohm in the size previously referred to, and others in which a graphite impregnated plastic film had a resistance approximating 50,000 ohms. Gauges spray coated with this colloidal material have shown resistances of 260 to 270 ohms with a sensitivity factor K of approximately 5.5. Other gauges wherein the film 10 is formed from a graphite impregnated liquid plastic vehicle produced by the same concern have shown resistances of 40,000 and 50,000 ohms with sensitivity factors K of 12 to 15. As previously stated, the sensitivity factor K is the ratio of change of R divided by R to change of L divided by L, R being the resistance, and L the length of the gauge.

Other examples of gauges made with compositions suitable for brush, spray or printing applications include preparing tension test coupons by coating with a clear insulating lacquer then cementing down gold foil terminals by coating them with Dupont acrylic No. 1234 and pressing them down on the insulating lacquer, and masking the specimens as in Figure 5. Two test specimens were coated with a silver lacquer by means of a spray gun. The solution consisted of 60 to 70 parts finely ground or colloidal silver powder, 13 parts cellulose resin, and 10 parts acetate as a solvent or vehicle. These specimens showed a resistance of 1.27 ohms and the high strain sensitivity factor of 10.5, being repeatedly stressed up to 38,000 p. s. i. A second pair of similarly prepared coupons were coated with a conducting vinyl lacquer composed of Vinylite VMCH 100 parts, santicizer 140, 40 parts and Shawinigan acetylene black, approximately 42 parts. These solids were dispersed in a suitable lacquer solvent and ball milled to insure dispersion of the black. The santicizer was used as a placticizer for the vinylite. The Shawinigan black was chosen as the most readily available highly conductive black, and was slightly varied between the specimens to produce resistances of 3,900 and 4,500 ohms respectively. These specimens had an average strain sensitivity factor of 2.5, were repeatedly stressed up to 36,000 p. s. i., and one, on checking for output, developed 66 mv. at this stress. The hysteresis was so low that it could not be shown in Figure 10.

The gauge, as so far described, may be built up in situ on the article A if the latter is itself non-conductive electrically, or if the article is first coated with two or three mills of an electrically insulating varnish or lacquer 17 rated at 400 to 600 volts per mil. In the case of anodic treated aluminum the anodic coating usually has sufficient insulating effect to permit direct application thereto of the liquid types of film material, when applied by brush or spray methods, but is inadequate when using the vaporization and sputtering processes, to be described, because of the strong penetrating effect of the latter.

In cases of bulky or built-in articles to be tested, it is more convenient to build up the finished strain gauge on an insulating base 14, such as rice paper; and to later cement the completed gauge in place on the article to be tested. Such mounting procedures differ in no way from present practice with existing types of wire wound strain gauges, wherein Duco household cement, a cellulose type cement, Bakelite, or Acrylic No. 1234, are used, so that the cementing procedure will not be elaborated upon herein.

Figure 5 illustrates the method of masking around the desired area of film strip 10 to be deposited onto either the article A itself or onto the intermediate insulating base 14. The prepared lead-in wires 11 with their attached conductive foils 12 are first cemented down on the article A or base 14 at the desired distance apart. Thereafter a mask is built up as by applying strips 18 of cellulose or cellophane pressure sensitive tape to expose the desired area to receive the film material 10. After the film 10 has been built up to the desired thickness and/or resistance value by one of the methods to be described, the masking strips 18 are removed, leaving the finished strain gauge either on the article A itself, or on the insulating base 14 for later application to the article to be tested.

The evaporation and sputtering methods of depositing and building up the film 10 are schematically shown in Figures 8 and 9 and described in more detail in Circular 389 of the Bureau of Standards, previously referred to. In the sputtering process of Figure 9 the masked lead-in wires, etc. of Figure 5 are positioned above an anode 20 in a bell jar 21 and the material to be deposited as the film 10 forms the cathode of a high voltage circuit 22; the bell jar being evacuated to a pressure on the order of $10^{-4}$ to $10^{-6}$ mm. Hg. The sputtering process may also be used to bond the lead-in wires to the base 14 or article A; as previously mentioned in connection with Figure 3, as the directional characteristics of the sputtering deposit are controllable, as by a movable or rotating mask or shutter 23 operable from outside the bell jar, as by a handle 24.

The progress of the evaporation and sputtering processes can be checked visually by timing the deposit or by measuring the reflectivity of a piece of glass exposed to the depositing material, or electrically by including the lead-in wires 11 in a suitable circuit set up to measure the changing resistance in the film 10 as it is built up between the two lead-in wires, or a separate testing device may be used to measure the resistance of the film deposited. When using highly conductive metals the desired film thickness may be barely microscopic, on the order of a few wave lengths of light or angstrom units.

In the evaporation process schematically shown in Figure 8, a bell jar 24, arranged to be evacuated as in the sputtering process, has the masked lead-in wires of Figure 5 positioned on a suitable support 25. The material to be deposited, which, for example, may be in the form of a short length of wire 26, is placed in a heating coil 27 having lead-in wires 28, the coil being heated to a desired temperature by an external electrical circuit, not shown. The coil and material 26 are then heated to a temperature sufficient to cause the latter to evaporate, i. e. to a point where the vapor pressure of the material is greater than the pressure within the bell jar. Illustrative examples of absolute temperatures required are approximately 1460 for aluminum, 1700 for iron and nickel, and 2330 for platinum; these temperatures decreasing with increase in the degree of evacuation of the bell jar. This process is not limited to the deposit of pure metals, but is also effective for both metallic alloys and salts of the heavy metals. The evaporation process can also be used to deposit two metals or the like simultaneously, and can be combined with the sputtering process to simultaneously or successively deposit two or more materials.

The evaporation process can be used to obtain special electrical properties, as alloys in very thin layers are possible by establishing a vapor phase that has the same composition as that of the desired alloy. This is true even if the vapor pressure of the components of the alloys are widely separated, as the deposited metal shows the same composition as the alloy within close limits.

A valuable characteristic of the evaporation method of forming strain gauges is that a deposit can be made on either a conductor or a non-conductor such as paper, glass or ceramic materials. Another great advantage of this method or process is that if the deposit is made directly upon the article to be used for strain measurements, no cement is required, since apparently an atomic or molecular bond is obtained between the deposit material and the base material, i. e. the article A or the insulating base 14.

In both the sputtering and evaporation methods it is necessary that any cement, insulating varnish, or the like, used in preparing the gauge prior to the film deposition step, be of a low gassing type in a vacuum. The pressure sensitive adhesives used on cellophane or cellulose tape, and the cellulose type cement such as Duco household cement have been found to be satisfactory.

I have constructed strain gauges of various materials using the evaporation method; an example of which is a gauge of the dimensions previously mentioned wherein aluminum was evaporatively deposited on the set-up of Figure 5, to a thickness of approximately 500 angstrom units. The thickness of the coating could readily be controlled within one percent. Such gauges showed resistances from 2600 to 2800 ohms, with very little hysteresis through the strain operating range.

Painted or sprayed or printed films 10 may be directly applied to non-conductive articles masked as in Figure 5, or to paper or other insulating bases 14 for mounting on conductive articles to be tested. If applied to an intermediate insulating base 14 the well known decalcomania transfer process may be used wherein the base of the transfer is formed from an electrically insulating varnish, which remains an integral part of the strain gauge when the transfer has been mounted on the article to be tested.

The paint, varnish, rubber or ink to be so applied is initially in the form of a suspension or solution of conductive material in a suitable liquid vehicle solvent or liquid plastic, which is dried or polymerized after application to the article or insulating base 14.

The film 10 may also be formed by chemical or electro-chemical deposition in situ. An example of the former is the carbonyl decomposition process, wherein the carbonyl of the given element such as iron or nickel carbonyl is introduced into a chamber maintained at approximately 400° F. and the article passed therethrough. Deposition is rapid, adherent, and the thickness thereof can be readily controlled. The well known electroplating process is an example of the latter.

It will thus be seen that I have invented an improved and easily manufactured electrical strain gauge comprising a film of electrically conductive strain sensitive material applied and self-bonded to lead-in wires, said film being deposited by a variety of methods either on the article to be tested or on an insulating base for subsequent transfer to said article.

I have given several specific examples of gauges constructed to provide widely varying characteristics of sensitivity and resistance. In Figure 10, I have shown the output characteristics obtainable in a bridge circuit intended to be especially sensitive to strains resulting from a stress of 5000 p. s. i. On the other hand the gauge may be pointed to much higher stresses and differing sensitivities to provide extreme flexibility to differing test or operating requirements.

While the gauges of this invention are primarily intended for strain and stress measurements, they may also be applied to other uses such as in transducers, dynamometers, pressure measuring devices, load measuring devices, telemetering and in circuits where the disclosed types of controlled film-like coatings can be used for frequency modulation, amplitude modulation, or pulse modulation of a signal.

Having described only typical forms of the invention I do not wish to be limited to the specific details herein set forth, but wish to reserve to myself any variations or modifications that may appear to those skilled in the art and fall within the scope of the following claims.

I claim:

1. An electrical strain gauge of the type described comprising an insulating base, terminal lead-in wires defining the length of said gauge preformed sheet metal, foil terminals electrically bonded to said wires, said terminals and that part of the lead-in wires bonded thereto being cemented to said base, and a homogeneous film-like strip of strain sensitive electrically conductive material overlying said foil terminals and electrically bonded thereto, said strip being self-adhering to both the foil terminals and the insulating base.

2. The method of forming a strain sensitive gauge of the type described comprising evaporatively depositing, under high vacuum conditions, a thin film-like strip of strain sensitive electrically conductive material compounded from at least two materials having different temperature electrical characteristics compensating one another whereby the resulting film like deposit has a temperature responsiveness approximating that of the article on which the finished strain sensitive gauge is to be used, and building up the thickness of said film to a desired resistance value.

3. The method of forming a strain sensitive gauge of the type described comprising evaporatively depositing, under high vacuum conditions a thin film-like strip of strain sensitive electrcally conductive material on an insulating base, the material of the film like strip being composed of two or more materials successively deposited to form a temperature compensated laminated film-like deposit, and building up the thickness of said film to a desired resistance value.

4. The method of forming a strain sensitive gauge of the type described wherein lead-in wires are first bonded to preformed sheet metal foil terminals and then secured in spaced relation to an insulating base, and evaporatively depositing under high vacuum conditions, a film-like strip of strain sensitive electrically conductive material over said foil terminals and on the insulating base therebetween, and building up the thickness of said film to a desired resistance value.

WALTER L. HOWLAND.

REFERENCES CITED

The following references are of record in the file of this patent:

UNITED STATES PATENTS

| Number | Name | Date |
| --- | --- | --- |
| 1,819,246 | Jones | Aug. 18, 1931 |
| 2,159,106 | Richter | May 23, 1939 |
| 2,334,843 | Ruge | Nov. 23, 1943 |
| 2,414,793 | Becker et al. | Jan. 28, 1947 |
| 2,430,994 | Reynolds | Nov. 18, 1947 |
| 2,431,923 | Dimmick | Dec. 2, 1947 |
| 2,438,205 | Coates | Mar. 23, 1948 |

OTHER REFERENCES

De Forest et al., N. A. C. A. Technical Note No. 744, January 1940, pages 4 and 5.